United States Patent [19]

Patzer et al.

[11] Patent Number: 4,698,889
[45] Date of Patent: Oct. 13, 1987

[54] SYNCHRONIZER BLOCKER RING CORE OF LOW MATERIAL THICKNESS WITH COINED LUGS

[75] Inventors: Helmut Patzer, Sandhausen; Manfred Giese, Sinsheim; Rudolf Muller, Ladenburg, all of Fed. Rep. of Germany

[73] Assignee: Borg-Warner Automotive, Inc., Troy, Mich.

[21] Appl. No.: 869,761

[22] Filed: Jun. 2, 1986

[30] Foreign Application Priority Data

Jun. 3, 1985 [DE] Fed. Rep. of Germany ....... 3519810

[51] Int. Cl.⁴ .............................................. B23P 15/14
[52] U.S. Cl. ..................................... 29/159.2; 72/341
[58] Field of Search ................. 29/159.2; 74/339, 340; 72/332, 333, 335, 336, 341; 192/52 E, 52 F, 52 G

[56] References Cited

U.S. PATENT DOCUMENTS

| | | | |
|---|---|---|---|
| 2,246,022 | 6/1941 | Tinnerman | 72/335 |
| 4,209,086 | 6/1980 | Friedrich | 192/53 F |
| 4,254,540 | 3/1981 | Bilak | 29/159.2 |
| 4,267,912 | 5/1981 | Bauer et al. | 192/53 F |

FOREIGN PATENT DOCUMENTS 1089470  3/1955  France ............................. 192/53 E

*Primary Examiner*—P. W. Echols
*Attorney, Agent, or Firm*—James A. Geppert

[57] ABSTRACT

A new core for a synchronizing ring for gear synchronization is produced using a punching and stamping method. The lugs for coupling to the clutch are produced by stamping from the material of the conical core.

2 Claims, 8 Drawing Figures

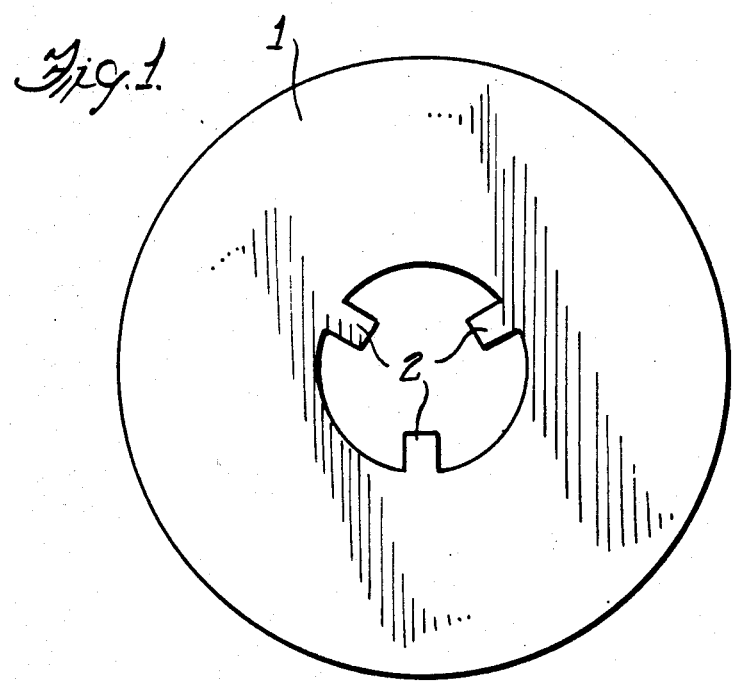
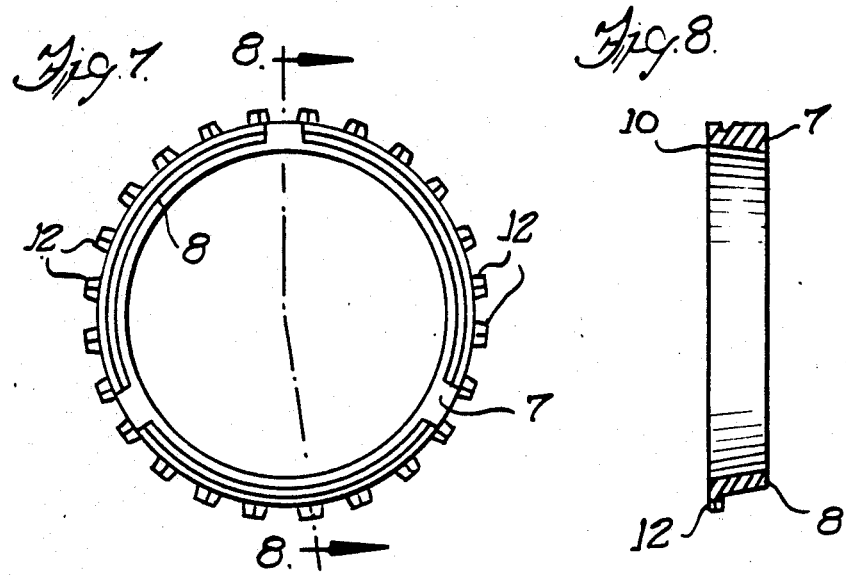

SYNCHRONIZER BLOCKER RING CORE OF LOW MATERIAL THICKNESS WITH COINED LUGS

BACKGROUND OF THE INVENTION

The present invention relates to a support with low material thickness for a synchronizing ring for gear synchronization with a conical friction contact surface, an outer sprocket and stops for coupling to the clutch.

Various types of supports are known for synchronizing rings; these differing mainly in the selection of material. As far as shape is concerned, the supports consist substantially of a ring-shaped body having a sprocket on its outer edge for positive locking to the corresponding moving wheel. Several, usually three, lugs or pockets, displaced by 120°, are provided on the surface of the ring-shaped part which act as stops for coupling the synchronizing ring to the clutch.

Synchronizing rings of this type are usually produced by a casting process, however, it has also been proposed to produce synchronizing rings by a punching and drawing process. For example, French Pat. No. 1,553,343 describes such a method where fist a hat-shaped object is produced by a deep-drawing method, the edge of which is provided with a sprocket in the subsequent process step and the bottom of which is removed. The last process step produces three recesses in the ring-shaped body, these recesses serving as stops for coupling to the gearshift sleeve. This synchronizing ring could not satisfy all the requirements qualitatively that could be fulfilled by a synchronizing ring produced by the casting method. Thus, for example, the transition from the ring-shaped part to the sprocket ring had a rounded portion on the inner surface which is undesirable because it cannot be utilized for the synchronization process. Also, when there is a tight fit, the recesses are disadvantageous for locking to the gear-shift sleeve because they also reduce the frictional contact.

The task of the present invention is to create a support for a synchronizing ring, which support can be introduced even when there is a tight fit and, in spite of this, it has maximum frictional contact on its conical friction surface.

SUMMARY OF THE INVENTION

According to the present invention, in the case of a support of the type described at the outset, the solution of this task is achieved by producing the stops that protrude from the ring-shaped body in the ring-shaped material, by stamping. The support material can be deep-drawn, so that the stamping of the stops projecting from the ring-shaped body is possible from the front. The stamping is done in such a way that the conical friction surface is not adversely influenced; that is, that the entire surface of the friction cone is available for the synchronization process. No recesses or notches are present; moreover, the ring-shaped body is preferably formed in such a way that the transition from the ring-shaped body to the sprocket ring provides a sharp corner. As a result of this, the space that is available for frictional contact is completely utilized in the axial direction.

The method for producing a synchronizing ring according to the present invention is performed in several steps. First, a ring is prestamped from a deep-drawable material strip, whereby the ring is equipped with several lugs protruding toward the inside, the number of lugs corresponding to the intended number of stops. Then this ring is drawn to a conical shape with an edge remaining on the outside in the original plane of the ring. After that, the lugs of the conical portion are slit approximately half way. This slitting permits compression of the lugs in the axial direction to form the stops. Simultaneously with this compression process, the forming and sizing of the conical part and of the conical frictional contact surface can also be performed. Then the sprocket is stamped from the outer edge and the tooth profiles are stamped and cut.

DESCRIPTION OF THE DRAWINGS

The following are shown:

FIGS. 1 to 6 show the individual process steps schematically,

FIG. 7 shows a top plan view of the synchronizing ring; and

FIG. 8 is the cross-sectional view of the synchronizing ring taken on the line 8—8 of FIG. 7.

DESCRIPTION OF THE PREFERRED EMBODIMENT

Figure 2:
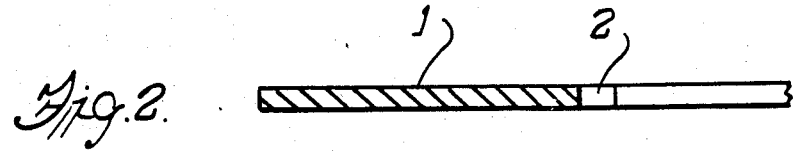

In the method according to FIGS. 1 to 6, first a ring 1 is prestamped from a deep-drawable material strip; this ring is then provided with three lugs 2 pointing inwards. FIG. 2 shows ring 1, half in cross section.

Figure 3:
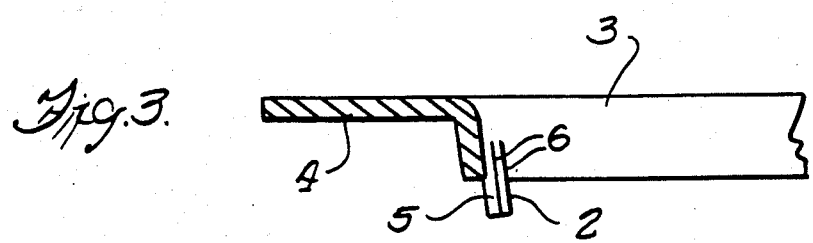
Figure 4:
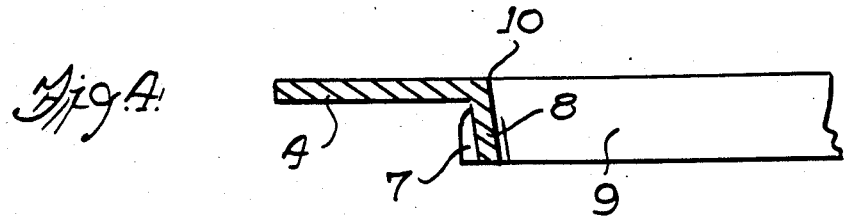

As shown in FIG. 3, ring 1 is drawn to a conical portion 3 with outer rim 4. After that, slots 6 are applied in conical part 3 as a continuation of the edges 5 of the lugs. The lugs 2 are pressed in the axial direction so that stops 7 are formed. At the same time, the conical ring-shaped core 8 and the friction cone 9 are calibrated or formed and sized. In this process, a sharp corner 10 is produced as a transition from ring-shaped core 8 to the gear ring 11 shown in FIG. 5.

Figure 5:
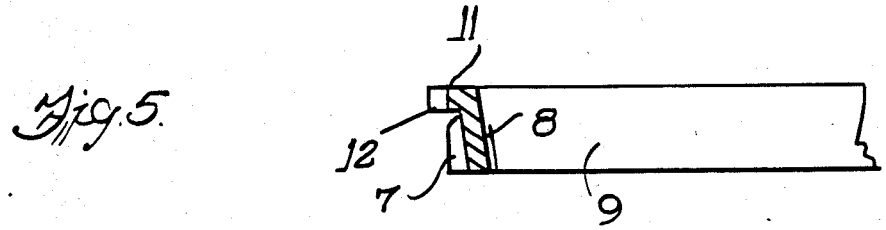
Figure 6:
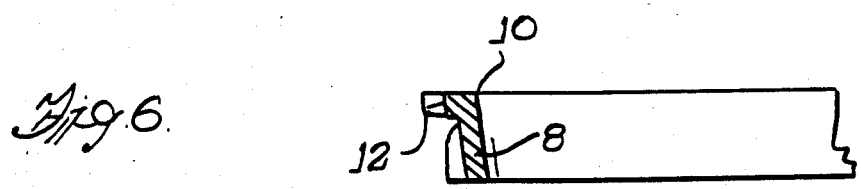

After stamping the tooth rim 12, as shown in FIG. 5, the tooth profiles or chamfers are coined and cut as shown in FIG. 6.

The finished core is shown in FIG. 7. It consists basically of conical core 8, a tooth rim 12 and stops 7. The outer appearance is identical with that of a cast core. However, the method of production is considerably simpler.

FIG. 8 shows the core in cross-section. One can see stop 7 in the upper half of the section. The conical core 8 with tooth rim 12 can be seen clearly in the lower half. Such a core has no pockets in the conical core nor are edges 10 rounded, although the support was produced by cold forming.

We claim:

1. Method for the production of a synchronizing ring having a plurality of stops and sprocket teeth, comprising the steps of
    prestamping a ring from a deep drawable material strip having a plurality of lugs with edges protruding radially inwardly of the ring and in a predetermined number corresponding to the number of stops;
    drawing the ring into a conical core having an inner friction cone and an outer rim;
    slotting the conical core in continuation of the lug edges along about one-half of the conical core;
    stamping the stops by pressing the lugs in the axial direction of the ring while calibrating the conical core and the friction cone;
    stamping the tooth rim; and pressing and cutting the sprocket tooth profiles in the rim.

2. Method for the production of a synchronizing ring as set forth in claim 1, wherein said ring is a flat annular member having the lugs on the inner periphery, and the outer rim on the conical portion extends radially outwardly from a sharp corner in transition with the conical core.

* * * * *